(12) United States Patent
Monetti et al.

(10) Patent No.: US 9,384,315 B2
(45) Date of Patent: Jul. 5, 2016

(54) METHOD, SYSTEM AND COMPUTER PROGRAM PRODUCT FOR ELECTRICAL AND THERMAL ANALYSIS AT A SUBSTRATE LEVEL

(71) Applicant: STMicroelectronics S.r.l., Agrate Brianza (IT)

(72) Inventors: Mattia Monetti, Malnate (IT); Alberto Balzarotti, Corbetta (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 45 days.

(21) Appl. No.: 14/325,088

(22) Filed: Jul. 7, 2014

(65) Prior Publication Data

US 2015/0020040 A1 Jan. 15, 2015

(30) Foreign Application Priority Data

Jul. 9, 2013 (IT) .............................. TO2013A0575

(51) Int. Cl.
*G06F 17/50* (2006.01)

(52) U.S. Cl.
CPC ........ *G06F 17/5072* (2013.01); *G06F 17/5036* (2013.01); *G06F 17/5081* (2013.01); *G06F 17/5068* (2013.01); *G06F 2217/78* (2013.01); *G06F 2217/80* (2013.01)

(58) Field of Classification Search
CPC ............ G06F 17/5068; G06F 17/5081; G06F 17/50872; G06F 2217/78; G06F 2217/80
USPC ................. 716/110–112, 118, 119, 124–125, 716/132–133
See application file for complete search history.

(56) References Cited

U.S. PATENT DOCUMENTS

| 6,230,306 | B1 * | 5/2001 | Raspopovic | ........ G06F 17/5077 716/129 |
| 6,530,065 | B1 * | 3/2003 | McDonald | .......... G06F 17/5036 716/102 |
| 7,418,683 | B1 * | 8/2008 | Sonnard | .............. G06F 17/5081 716/122 |
| 2012/0038057 | A1 * | 2/2012 | Bartley | ............... H01L 23/3677 257/774 |

(Continued)

FOREIGN PATENT DOCUMENTS

EP 0413479 A1 2/1991

OTHER PUBLICATIONS

IT Search Report and Written Opinion for IT TO2013A000575 mailed Apr. 8, 2014 (8 pages).

(Continued)

*Primary Examiner* — Stacy Whitmore
(74) *Attorney, Agent, or Firm* — Gardere Wynne Sewell LLP (57) ABSTRACT

A method for the automatic design of an electronic circuit includes operations for evaluation of the thermal effects in the electronic circuit. The method generates a layout of the electronic circuit. Abstract data at the substrate level associated to the layout of the electronic circuit is then generated. A grid of partitioning is generated with respect to a view regarding the aforesaid abstract into meshes and nodes. The grid is applied to the substrate. On the basis of the grid (TG), a list of nodes or netlist representing a thermal network that represents the thermal behavior of the substrate or of its portions or elements is extracted. The netlist is useful in simulation operations, in particular of a SPICE type, for making an evaluation of thermal effects in the electronic circuit.

25 Claims, 8 Drawing Sheets

(56) References Cited

U.S. PATENT DOCUMENTS

2014/0236559 A1* 8/2014 Fung .................. E21B 41/00
  703/10
2015/0019194 A1* 1/2015 Stella ................ G06F 17/5036
  703/14

OTHER PUBLICATIONS

Chvala A et al: "Power transistor models with temperature dependent parasitic effects for SPICE-like circuit simulation," May 13, 2012, pp. 255-258.
Shelar T S et al: "Inclusion of thermal effects in the simulation of bipolar circuits using circuit level behavioral modeling," Jan. 5, 2004, pp. 821-826.
Sudarshan Srinivasan et al: "Functional Test Pattern Generation for Maximizing Temperature in 3D IC Chip Stack," Quality Electronic Design (ISQED), 2012, 13th International Symposium on, IEEE, Mar. 19, 2012, pp. 109-116.
Sudarshan Srinivasan et al: "Maximizing hotspot temperature: Wavelet based modelling of heating and cooling profile of functional workloads," Mar. 14, 2011, pp. 1-7.
Szekely V et al: "Electro-Thermal Simulation: A Realization by Simultaneous Iteration," Microelectronics Journal, Mackintosh Publications Ltd., Luton, GB, vol. 28, No. 3, Mar. 1, 1997, pp. 247-262.
Vogelsong R S et al: "Extending SPICE for electro-thermal simulation," May 15, 1989, pp. 21.4/1-21.4/4.
Walkey D J et al: "A vcvs-based equivalent circuit model for static substrate thermal coupling," Sep. 30-Oct. 2, 2001, pp. 102-105.
Wei Liu et al: "Layout-Driven Post-Placement Techniques for Temperature Reduction and Thermal Gradient Minimization," IEEE Transactions on Computer Aided Design of Integrated Circuits and Systems, IEEE Service Center, Piscataway, NJ, vol. 32, No. 3, Mar. 1, 2013, pp. 406-418.
Wilkerson P et al: "Fast, Automated Thermal Simulation of Three-Dimensional Integrated Circuits," The Ninth Intersociety Conference on Thermal and Thermomechanical Phenomena in Electrnoic Systems, 2004, Itherm '04, IEEE, Jan. 1, 2004, pp. 706-713.

* cited by examiner

METHOD, SYSTEM AND COMPUTER PROGRAM PRODUCT FOR ELECTRICAL AND THERMAL ANALYSIS AT A SUBSTRATE LEVEL

PRIORITY CLAIM

This application claims priority from Italian Application for Patent No. TO2013A000575 filed Jul. 9, 2013, the disclosure of which is incorporated by reference.

TECHNICAL FIELD

The present description relates to techniques for automatic design of an electronic circuit.

BACKGROUND

In the present description, by "electronic circuit" is meant in general a single integrated circuit or systems of integrated electronic circuits, to be obtained via technologies of machining of integrated circuits on chips that define a substrate for fabrication of the circuit.

Various embodiments may find application in computer apparatuses such as workstations, server computers, and the like.

Known to the art are tools for design of substrates that operate in the environment for design of electronic systems and circuits, i.e., electronic-design-automation (EDA) environments. In particular, among EDA environments there is known, for example, the design suite Cadence, which comprises, in a version thereof, a platform called Virtuoso Platform for designing full-custom integrated circuits, which comprises entry of the schematics, behavioral modeling (Verilog-AMS), circuit simulation, full-custom layouts, steps of verification at a physical level, extraction of netlists.

The tools for assisted electronic design available hence provide a very limited support when it is a question of evaluating the interactions between electronic devices of the aforesaid electronic systems and circuits in a chip at the level of the substrate of the chip.

In this context of paucity of tools that operate at the substrate level, even fewer are the tools that enable evaluations to be made on the thermal behavior of the circuit at this level.

There is known, for example, available also for integration with design programs, such as the aforementioned Cadence, a software tool developed by Gradient called HeatWave, which employs a thermal model that uses the layout data (for example, generated by Cadence Virtuoso) of the integrated circuit and a thermal technical file that contains the thicknesses of the layers and the properties of materials, including their temperature dependence.

However, even though this tool manages to carry out complex thermal simulations, also taking into account effects of the package, it does not supply effective information on the behavior at the substrate level and is not able to make electro-thermal simulations, in the simulation environment itself, that are at the same time precise and fast.

In the context outlined above, there is felt the need to evaluate the thermal interactions between electronic devices of the aforesaid electronic systems and circuits in a chip at the level of the substrate of the chip itself, overcoming the drawbacks outlined previously.

SUMMARY

Various embodiments are aimed at meeting the above need.

Various embodiments may also refer to a corresponding system of computers, as well as to a computer program product that can be loaded into the memory of at least one computer and comprises portions of software code that are able to execute the steps of the method when the product is run on at least one computer. As used herein, the reference to such a computer program product is understood as being equivalent to reference to a computer-readable means containing instructions for control of the processing system for coordinating implementation of the method. Reference to "at least one computer" is evidently intended to highlight the possibility of the present invention being implemented in modular and/or distributed form.

The present invention relates to a method for automatic design of electronic systems and circuits.

According to one aspect, this method comprises generating a layout of said electronic circuit, generating abstract data at the substrate level associated to the layout of said electronic circuit, generating a grid of partitioning, with respect to a view regarding said abstract, into meshes and nodes and applying it to said substrate, extracting, on the basis of said partition grid, a list of nodes or netlist representing a thermal network that represents the thermal behavior of the substrate or of its portions or elements, using said netlist in simulation operations, in particular of a SPICE type, for making an evaluation of said thermal effects in said electronic circuit.

It is then envisaged to discriminate, in the above layout, regions, in particular on the basis of a dissipation-based criterion, divide the electronic circuit according to a plurality of vertical layers, separate in each of said layers different areas on the basis of given technological parameters that identify the areas, and apply the partition grid (TG) to each region (R) of each layer.

According to a further aspect, the above operation of applying a partition grid comprises applying a Delaunay triangular grid and obtaining from said Delaunay triangular grid corresponding Voronoi points.

According to a further aspect of the invention it is envisaged, for each layer, to: analyze grid elements obtained from the partitioning operation, as a function of a technology-configuration file regarding the grid element analyzed, calculate thermal parameters to be associated to the aforesaid grid element; on the basis of the aforesaid thermal parameters of the grid elements, construct a representation of the layer as sparse matrix of the aforesaid thermal parameters.

It is then envisaged to construct, on the basis of the above matrices, a general sparse matrix and convert this general sparse matrix into a complete netlist.

According to one aspect, it is envisaged to extract thermal dependences between two or more heat sources identified in the above matrix via the operations of reducing each source to a single node, compute, with the superposition principle separately from each source, a reduced thermal matrix, and extract a corresponding reduced netlist.

According to a further aspect, it is envisaged to use the aforesaid netlists for thermal or electro-thermal simulations, in this case simulating simultaneously both the electrical behavior and the thermal behavior of the electronic circuit or of a device thereof, taking into account the interactions with the electronic circuit or with parts thereof.

According to a further aspect, it is envisaged to make an electro-thermal simulation via configuration of the above simulation operation for operating with descriptions of models or sub-circuits of the aforesaid electronic circuit defined as comprising a thermal node, connect to the aforesaid thermal node an equivalent current generator that forces into the thermal node a current equivalent to the power dissipated in the aforesaid model or sub-circuit, and associate to the voltage that is set up on the aforesaid thermal node an increase in temperature of the model or sub-circuit with respect to the global temperature by connecting to the thermal node thermal networks representing the mutual heating of the electronic circuit represented by the aforesaid complete netlist or by the aforesaid reduced netlist, in particular calculated having as sources the aforesaid model or sub-circuit and another heat source of the electronic circuit.

According to a further aspect, it is envisaged to associate to nodes defined by the aforesaid sparse matrix thermal capacities that are calculated as a function of the volume of a corresponding element of the partition and of the respective technological parameters and are associated between the node and a thermal-ground reference node.

According to a further aspect, a system for automatic design of an electronic circuit is provided, comprising at least one computer configured for implementing the method, as well as a computer program product that can be loaded directly into the memory of at least one computer and comprises portions of software code for implementing the method.

BRIEF DESCRIPTION OF THE DRAWINGS

Various embodiments will now be described, purely by way of non-limiting example, with reference to the annexed drawings, wherein.

DETAILED DESCRIPTION OF THE DRAWINGS

Illustrated in the ensuing description are various specific details aimed at an in-depth understanding of various examples of embodiment. The embodiments may be provided without one or more of the specific details, or with other methods, components, materials, etc. In other cases, known structures, materials, or operations are not shown or described in detail so that the various aspects of the embodiments will not be obscured. Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in various points of the present description do not necessarily refer to one and the same embodiment. Furthermore, particular conformations, structures, or characteristics may be combined in any adequate way in one or more embodiments.

The references used herein are provided merely for convenience of the reader and hence do not define the sphere of protection or the scope of the embodiments.

The thermal list of nodes referred to above is supplied as a netlist, in particular of a flat type for an instance-based simulator, in particular a flat SPICE netlist, so as to be compatible with different simulators and fast SPICE simulators.

By "netlist" or "list of nodes" is here understood in general a description of the connectivity of an electronic project, in particular the design of an electronic circuit. As will be better explained in what follows, a thermal netlist represents the equivalent electrical circuit of a thermal model.

By "flat netlist" is meant a netlist of a flat design, in which only the primitive instances are instantiated. Possible hierarchical designs are exploded in a recursive way, creating new copies of each definition whenever it is used. For this reason, flat netlists tend to create much larger netlist databases.

Figure 1:
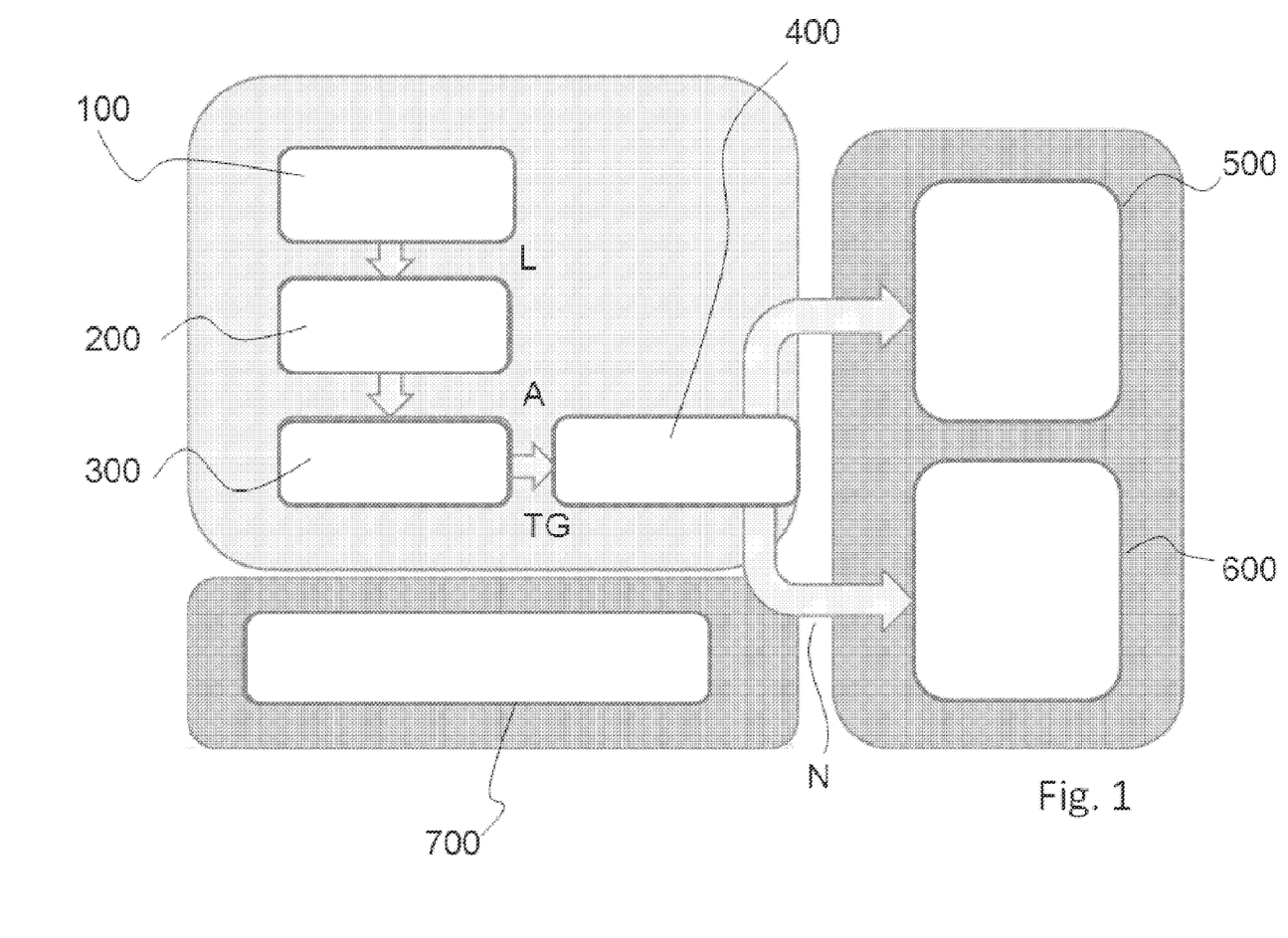
FIG. 1 is a principle flowchart representing embodiments.

FIG. 1 shows a general scheme of the method.

Designated by 100 is an operation of definition of the layout database as far as the substrate level via a layout-design software tool, in particular using, for example, the EDA Cadence platform Virtuoso Platform. In other words, using a tool for design of devices and circuits, a layout of the electronic circuit is generated, and the data that define the layout are stored in a database.

Starting from the layout database, from which a layout view L is generated, in a step 200 there is carried out generation of abstracts A and refinement of the abstract data generated. The method envisages, in one embodiment, obtaining the generated abstract A via an operation of simplification of the layout view at the substrate level, distinguishing, for example, between thermally dissipating structures and thermally non-dissipating structures. The abstracts are in any case created starting from the detailed layout in the database of the abstracts, i.e., the elements for the so-called abstract view of the elements (cells) defined in the layout, which comprise summary information such as name of the cell, orientation, names of the pins, and other information. How an abstract generator operates starting from the layout is in itself known to the person skilled in the sector. It is to be noted that the method, in the embodiment described herein, is integrated with the Cadence environment, in so far as it is possible to launch the corresponding program without exiting from this environment; moreover, for the processing the layout the method or program is based on the Cadence database.

Hence, in a step 300, generation of a partition grid TG with respect to the abstract A, and possibly refinement of the aforesaid grid TG is carried out. The procedure for generation of the grid TG is carried out, for example, through execution of an external software module, for example the software 'Triangle' (which is available for free download, for example, at the URL https://www.cs.cmu.edu/~quake/triangle.html). The method and the corresponding computer program product are configured for executing this software module in an automatic way transparent to the user.

In a step 400, generation of a netlist N is then carried out, for example a complete netlist NC of the substrate, which describes the thermal network thereof.

The above complete substrate netlist NC is supplied to a netlist-simulation environment 500 incorporated in the method and system as further service.

The aforementioned netlist N or complete substrate netlist NC is then supplied to a coupled-electrothermal-simulation environment 600 incorporated in the method and system as further service.

Figure 2:
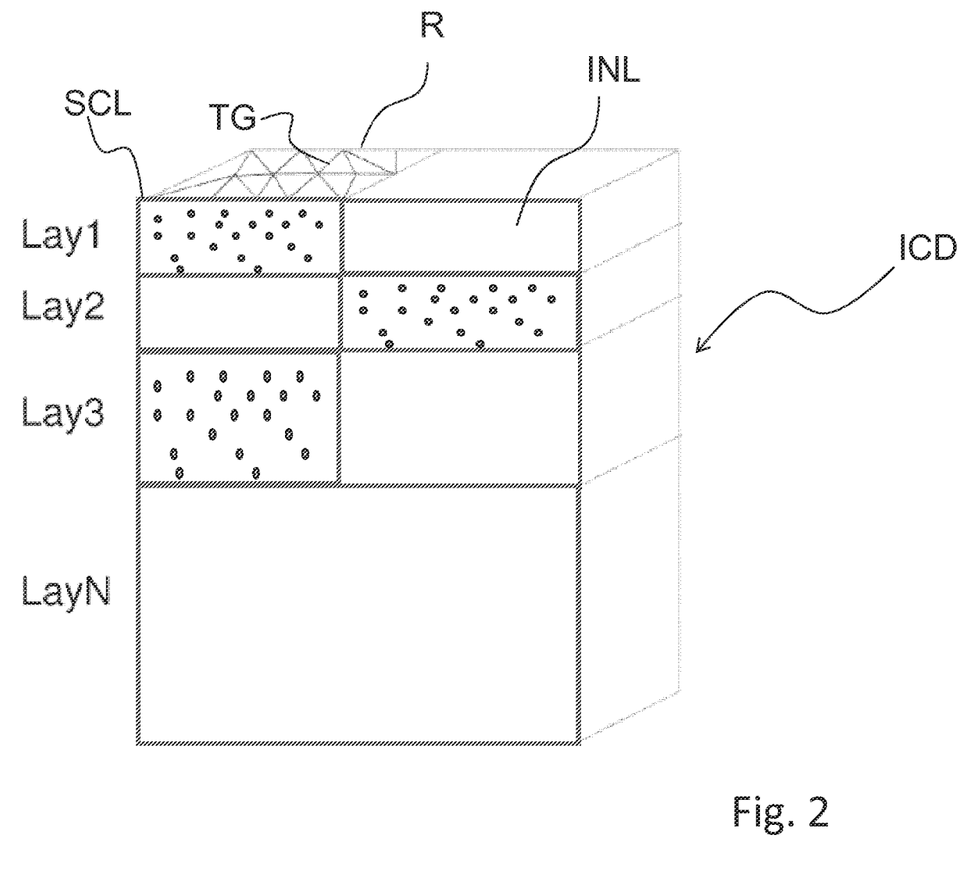
FIG. 2 is a schematic view of a device representing possible operating modalities of embodiments.

FIG. 2 shows a cross-sectional view of a portion of the substrate of a generic chip of an electronic integrated circuit, designated by the reference ICD, in order to illustrate a multilayer-approach description procedure 1000 described hereinafter with reference to FIG. 2. The portion ICD, which may represent a device, comprises layers with different properties, in particular from the thermal standpoint. In the present example, reference is made to a simplified model in which there may be considered semiconductor regions SCL, insulating regions INL, and (not shown) deep-trench regions. The description procedure 1000 comprises using a multilayer approach, which, with reference to the cross section of portion of the substrate of FIG. 2, envisages, given a view at an abstract level $A_i$ of the substrate and having discriminated, for example via a dissipation-based criterion, polygonal regions, usually corresponding to devices that dissipate power such as MOSs or BJTs, but also resistors and other devices, from the regions that do not dissipate power, carrying out the process of:

- dividing the substrate into a plurality of vertical layers, i.e., arranged in a vertical direction, from a top layer $Lay_1$ to a bottom layer $Lay_N$; this division is usually carried out according to the layers identified by the machining (fabrication) processes;
- separating in each i-th layer $Lay_i$ (represented in FIG. 2 in cross section), the various regions, which, in a view at the abstract level, are each associated to a different type of technological parameters that distinguish the aforesaid region, i.e., parameters that indicate, for example, whether it is a semiconductor region or an insulating region.

In one embodiment, the above operations are completely automatic and are based upon the abstract view and upon the topological information contained in this abstract view. The data regarding each portion of substrate are extracted by matching the above topological information contained in the abstract and the process data contained in the technological files.

With reference to the operations of grid generation described in what follows, FIG. 2 highlights how it is envisaged to use in step 400 for each layer $Lay_1 \ldots Lay_N$ one and the same partition grid TG traced on the top face of the top layer $Lay_1$, which is then applied to each layer $Lay_i$. This grid TG, as described in detail in what follows, according to one aspect of the invention, is a Delaunay triangular partition grid.

The technological parameters contained in the technological files refer, for example, to the thermal resistivity of the materials layer by layer and/or to their thermal capacity, in addition to the thermal parameters of thermal resistance or thermal capacity that are specific to the interfaces between layers or to the junctions.

Figures 3, 4, 5:
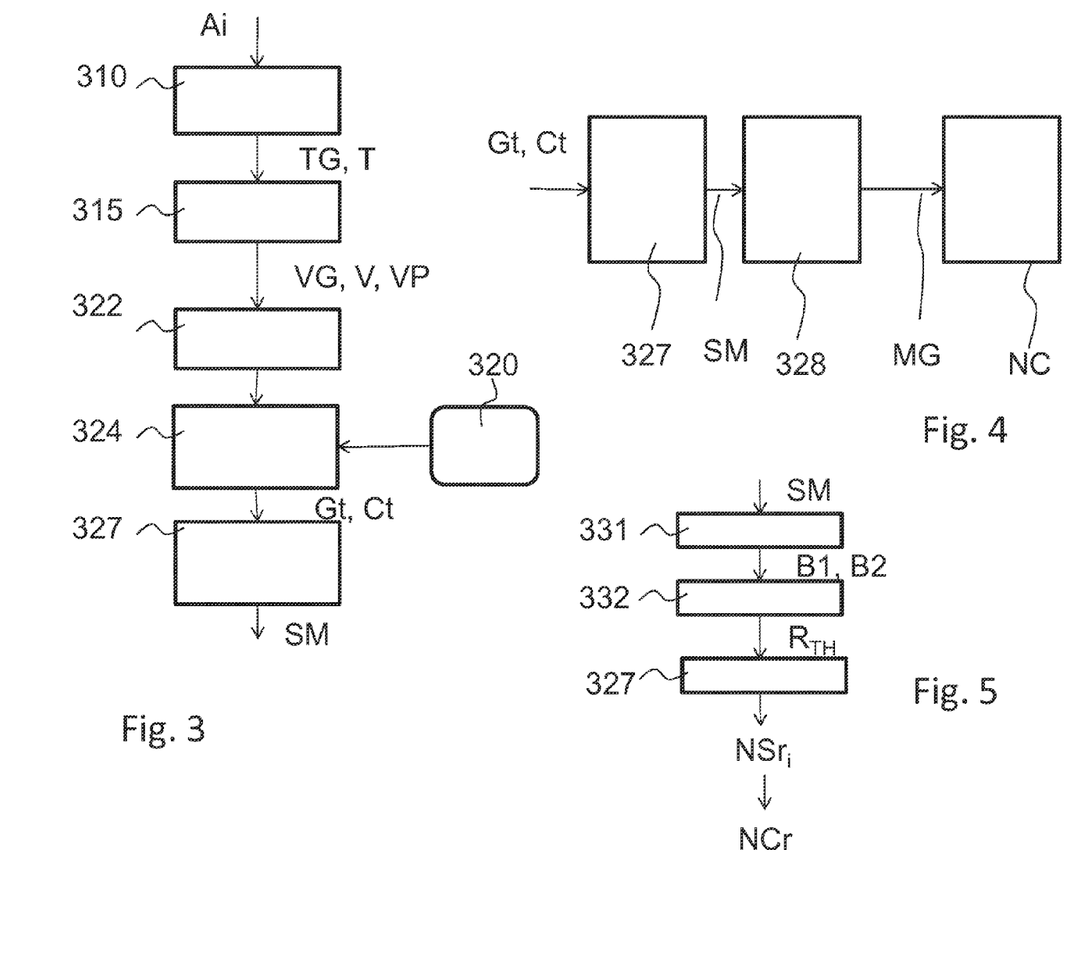
FIGS. 3, 4, and 5 are flowcharts representing embodiments of the method.

FIG. 3 shows a flowchart that describes in detail the process 300 of generation of the grid, which comprises, for each i-th layer $Lay_i$, a step 310 of generation of a Delaunay triangular grid TG. This step 310, as shown more clearly in FIG. 7, determines identification of a plurality of triangular elements T in each respective layer $Lay_1 \ldots Lay_N$ of a thickness corresponding to the thickness of the respective i-th layer $Lay_i$. It should be noted that the grid TG is unique and is generated on the abstract level. Through a 'projection' process, the grid is replicated on each i-th layer $Lay_i$. As discussed more fully in what follows, the resulting triangular elements T, which are in actual fact elements of the i-th layer $Lay_i$ having the shape of a triangular prism that has as base the triangle given by the partitioning operation and as height the thickness of the layer, are the basic elements for calculating for each layer a respective thermal matrix.

However, in a step 315, on the basis of the Delaunay triangular grid TG, a dual Voronoi grid VG is generated. This transformation, which is in itself known, determines a tassellation into Voronoi cells V. For the purposes of the method, the tassellation into cells is not in itself of interest, but what is of interest are the Voronoi points VP that the cells identify. As is known, the Voronoi point of a Delaunay triangle is the center of the circumference circumscribed to said triangle.

Next, in a step 322, each triangular element T of the i-th layer $Lay_i$ is analyzed in order to determine the dimensions thereof. To each triangular element T of the i-th layer $Lay_i$ a thickness and a type of material is attributed, according to its position in the abstract and to the i-th layer $Lay_i$ to which it is associated. From this information, in a step 324, the respective values of thermal conductance Gt associated to the specific triangle T are extracted. These values of thermal conductance Gt are connected between the Voronoi point VP pertaining to the triangle T and the Voronoi points obtained by applying step 315. In this step 324, as a function of a technology-configuration file 320, which provides information on the technological parameters of each layer and region, the elements of thermal conductance Gt to be associated to the points of the Voronoi grid VG are thus calculated, thus constructing a mesh of thermal resistances. In a step 327, a representation of the i-th layer $Lay_i$ is then constructed as sparse matrix SM of thermal conductances Gt. The sparse matrix SM is linked to the description of the mesh of thermal resistances for example via the so-called 'modified nodal method'. The value of each thermal resistive element is calculated for example on the basis of finite-element theory.

In an embodiment shown in FIG. 4, the above sparse matrix SM is passed to a sparse-matrix computing engine 328, which unites all the sparse matrices SM of the layers in a single general sparse matrix MG representing the complete three-dimensional structure. This is accompanied by a step of creation of a file with the abstract information. On the basis of the general matrix MG, in a step 328 a complete substrate netlist, or full netlist, NC, is then constructed, which indicates the connection of the thermal nodes to which the components are connected, in particular the thermal conductances in the example discussed here, calculated in step 324.

The above complete substrate netlist NC, as has been said, may be a flat netlist, which is advantageously simpler to instantiate, in so far as for this, for example, an 'include' command in the main SPICE netlist is sufficient. This type of description prevents the user from having to declare the points of access to the network, one for each abstract element. In terms of database structure, a description of a flat-netlist type does not entail any detriment from the standpoint of memory occupation during simulation, as compared to a description of a sub-circuit type, because this type of netlist is instantiated only once.

Figure 6:
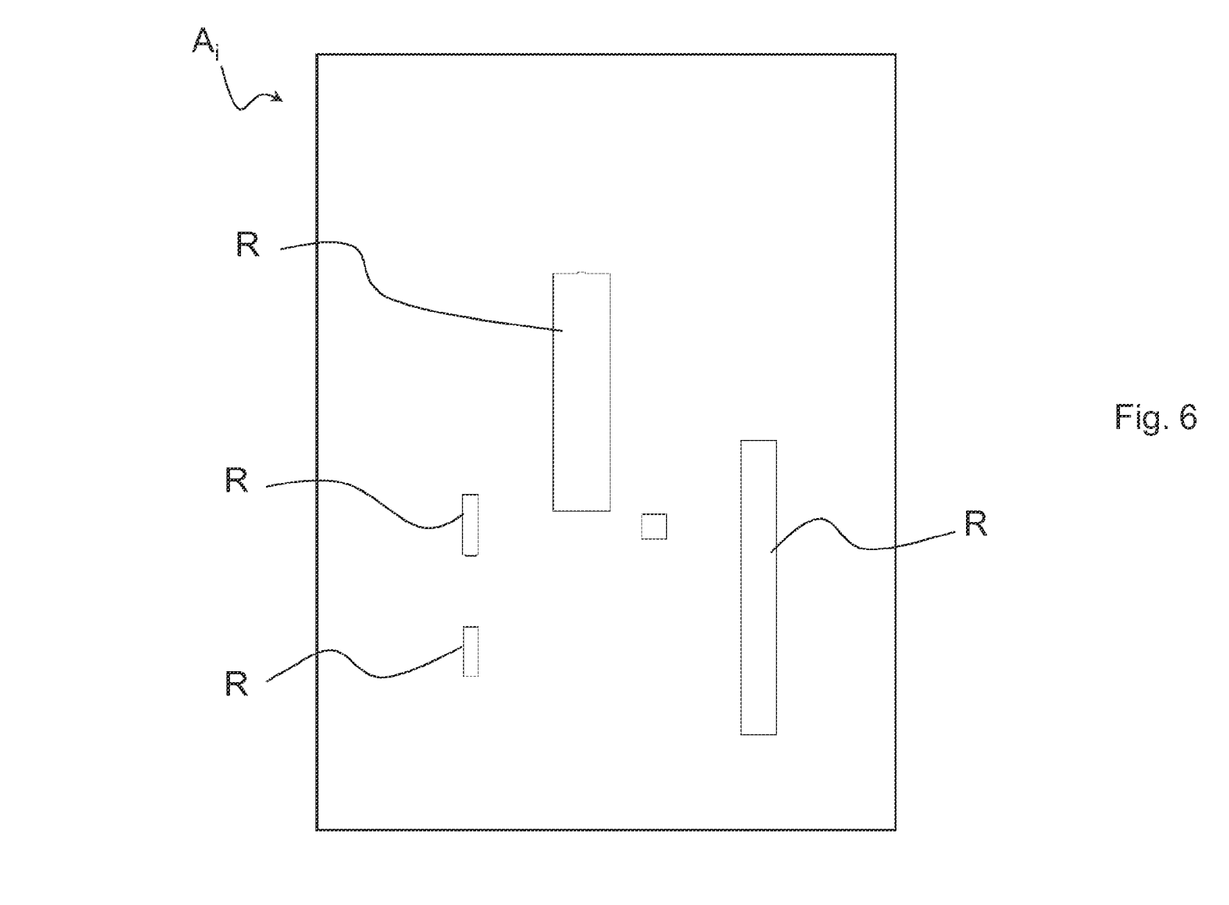
FIGS. 6, 7, 8a, 8b, and 8c are schematic views of a layout on which the method operates.

FIG. 6 shows the abstract view $A_i$ of an i-th layer $Lay_i$ as may be obtained for example through the Virtuoso Layout Suite, where regions R are present, which are rectangular, purely by way of non-limiting example, regarding five generic devices that dissipate power. This stems from the abstract-generation step 200 described previously. In particular, for example, in a way in itself known, display in layout mode of a design suite such as Cadence Virtuoso Layout Suite is opened, and an abstract sub-view A of the layout is generated.

On this abstract view $A_i$ of the i-th layer, in order to identify the regions R, it is in general possible to carry out 'merge', 'slice', and geometry-labeling functions. These functions, given a layer displayed at the abstract level, enable respectively merging and partitioning of the geometries generated automatically, and generation of progressive names or labels and assignment thereof to the geometries of the abstract view $A_i$. It is possible to carry out operations of definition of regions and compacting of regions that envisage operating on the original abstract view $A_i$ to modify it or generate artificial regions. Definition of the regions operates so as to consider generic areas of dissipation by the geometries of the abstract $A_i$ that are comprised in the artificial region, while compacting of the regions operates so as to preserve the overall area of the geometries comprised in the artificial region.

Given the generation of the triangular grid TG and of an associated database of the meshes of the grid, it is possible to carry out additionally also operations of local/global refinement. The operations of local/global refinement comprise, for example, indicating the quality of the mesh according to a trade-off between the desired resolution and the number of mesh elements generated.

Figure 7:
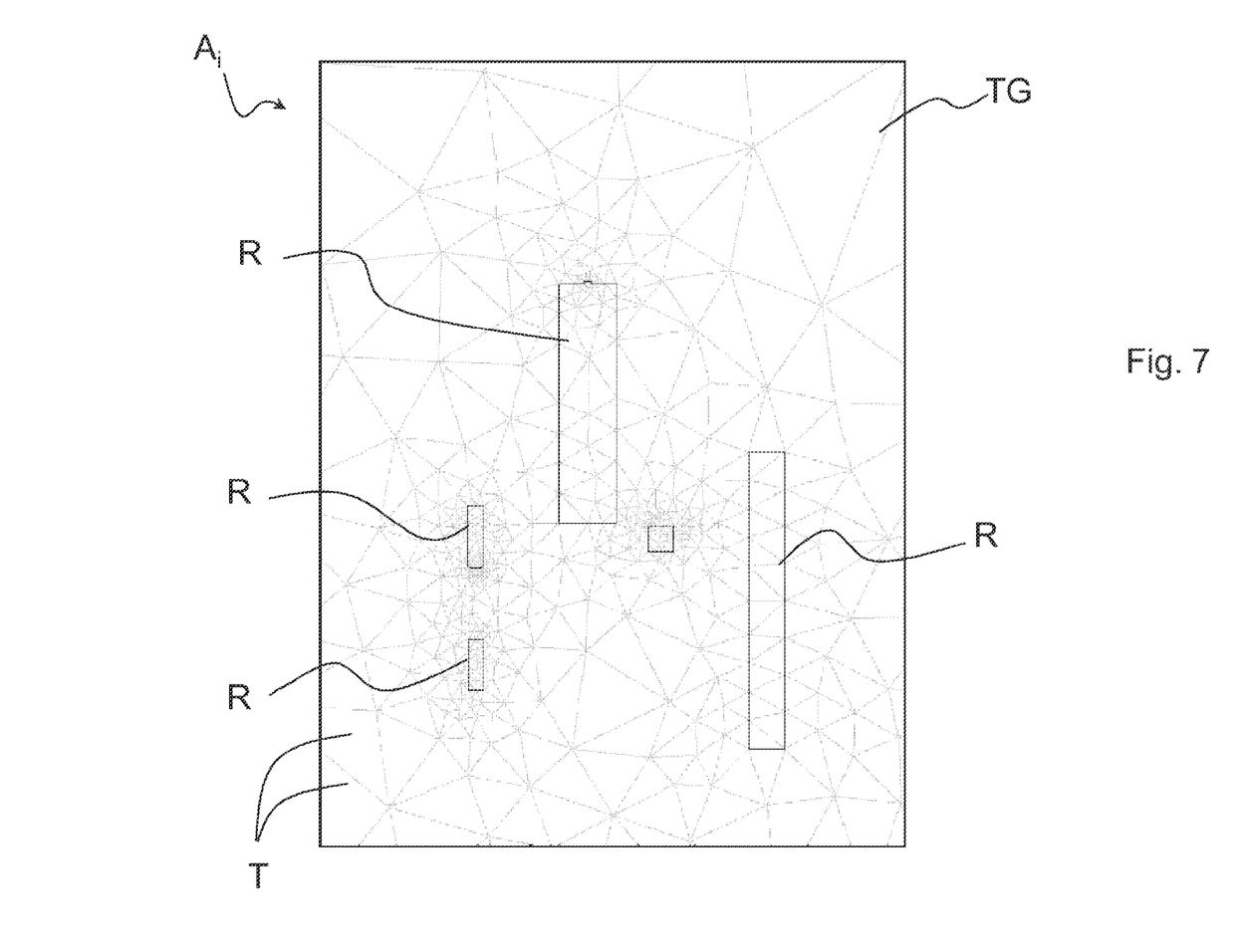

By way of example in FIG. 7, according to the operation 310 of FIG. 3, a Delaunay grid is then generated on the abstract view $A_i$ of the layer $Lay_i$.

Figures 8A, 8B, 8C:
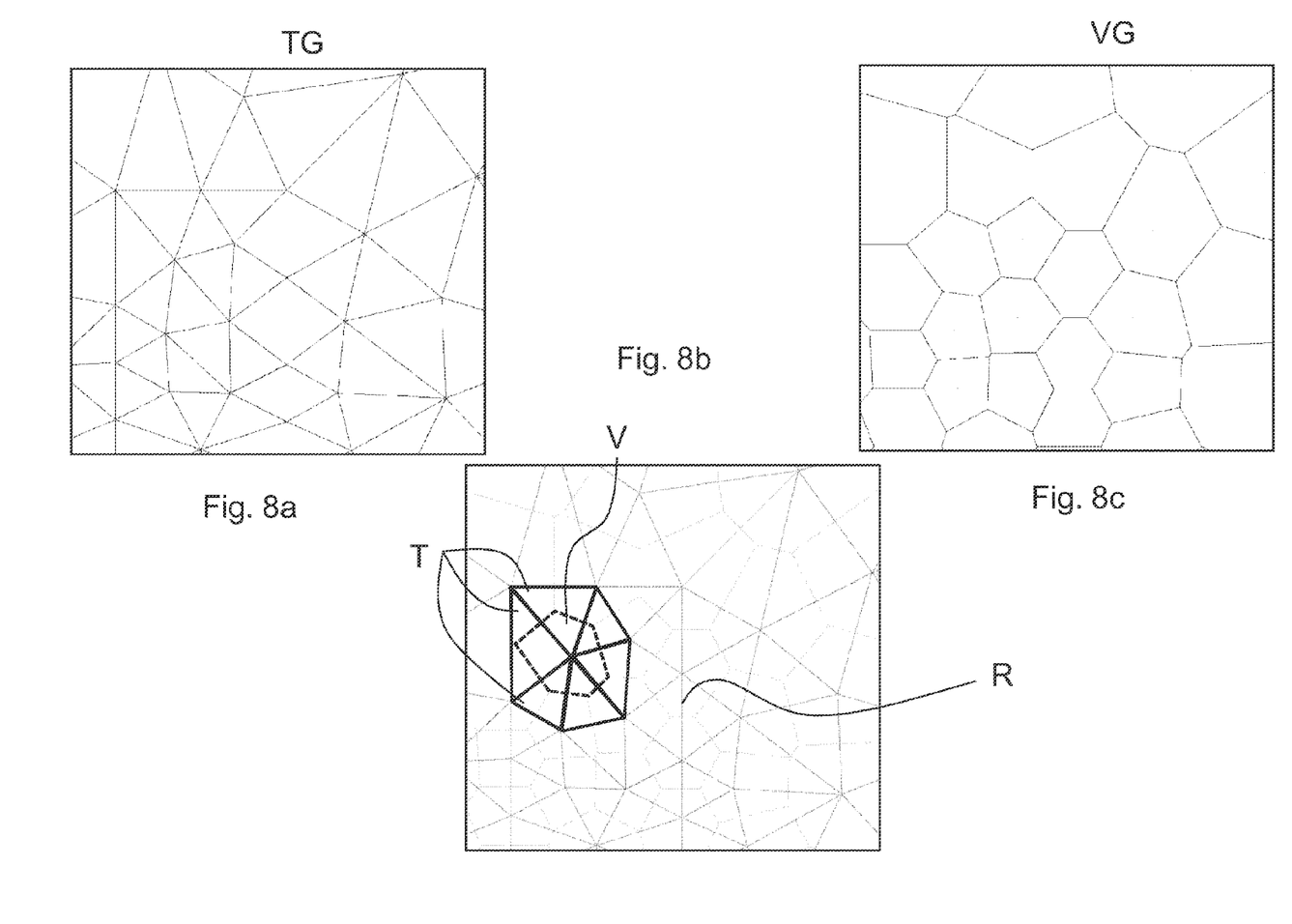

As shown by way of example in FIGS. 8a, 8b, and 8c, from a Delaunay grid TG, such as the one shown in FIG. 8a, a Voronoi grid VG, shown in FIG. 8c, is generated (step 315). In FIG. 8b both the grids TG and VG may be seen. In the Voronoi points VP of each cell V it is envisaged to connect the thermal resistors Gt for the static case and capacitors for the dynamic case.

As discussed previously, association, to the Voronoi points VP regarding respective triangles T, of the respective thermal conductances Gt calculated according to steps 322 and 324 produces the sparse matrix SM of thermal conductances, as indicated in FIG. 3.

This matrix SM is in practice constructed by assigning to each of the Voronoi points VP identified a progressive index, for example from 1 to n, and constructing the square matrix A in which each element $a_{pq}$, where p, from 1 to n, is the row index and q, from 1 to n, is the column index, indicates the value of thermal conductance G between two nodes.

Figure 9:
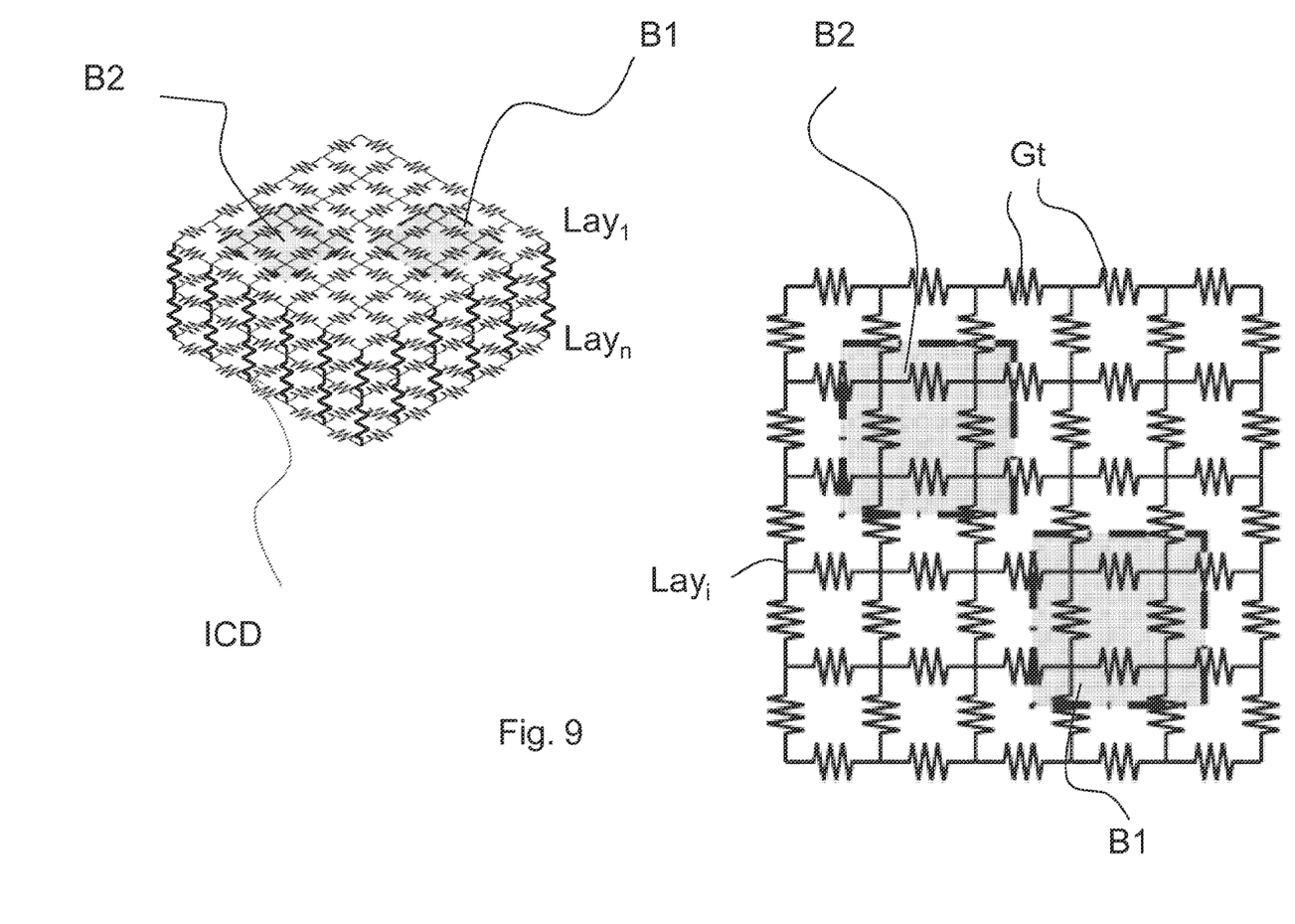
FIGS. 9 and 10 are equivalent representations that illustrate steps of a specific form of simulation implemented by the method.

This enables in general a representation as thermal network starting from the matrix as represented in FIG. 9. For each layer $Lay_1 \ldots Lay_n$ a representation layer by layer is obtained given by the respective matrix SM, where the thermal conductances Gt are indicated, whilst the layers at the nodes are joined by vertical thermal conductances that are calculated on the basis of the technological parameters and as a function of the thickness of the layer.

In this representation, two node areas B1 and B2 are moreover indicated that behave as heat sources, for example two areas corresponding to two devices, for example, two MOSFETs.

Hence, the operations described so far produce a matrix representation of thermal conductances of the substrate from the standpoint of the thermal model and a corresponding netlist, which can be used with the simulators.

The netlist, for example the complete netlist NC, can be supplied to the netlist-simulation environment 500 for a simulation of the thermal behavior alone. In other words, for example, a simulator of a SPICE type computes for instance the temperatures at the nodes, which are the thermal equivalent of voltages, applying current generators representing sources that dissipate power in specific nodes. Of course, this may be done also at the level of reduced complete thermal netlist NCr.

However, according to a preferred version of the method, the netlists produced by the method according to the invention are used in the coupled-electrothermal-simulation environment 600, which simulates simultaneously, via a simulator of a SPICE type, both the electrical behavior and the thermal behavior of a device or circuit, taking into account the interactions with the chip or with parts thereof.

In this context, according to a further aspect, it is envisaged, as has been said, to obtain reduced netlists to describe the interaction between two sources, such as B1 and B2 in FIG. 9.

There now follows a description of how static calculation is carried out in this regard.

Given the system of linear equations Ax=b, where:
A is the sparse matrix SM (symmetrical and nonnegative-definite) of thermal conductivities, which is considered three-dimensionally;
x is the solution of the system, in particular a temperature for each thermal node of the structure; and
b is the constant term (the sources applied to the system)

$$\begin{bmatrix} a_{11} & \cdots & a_{1n} \\ \vdots & \ddots & \vdots \\ a_{n1} & \cdots & a_{nn} \end{bmatrix} \cdot \begin{bmatrix} x_{11} & x_{12} \\ \vdots & \vdots \\ x_{n1} & x_{n2} \end{bmatrix} = \begin{bmatrix} b_{11} & b_{12} \\ \vdots & \vdots \\ b_{n1} & b_{n2} \end{bmatrix}$$

the method, according to a preferred embodiment, comprises solving the above linear system and extracting the thermal dependences between the sources B1 and B2 so as to reduce to a large extent the dimension of the solution matrix.

The extraction of the above dependences operates in a way similar to the superposition principle. The calculation of eigenvalues and eigenvectors can be applied to obtain frequency values to be used in the dynamic case.

It is consequently envisaged to operate as described in what follows, as shown in the flowchart of FIG. 5, namely by:
reducing 331 each source B1, B2, which in general is made up of a plurality of nodes in the matrix representation and in the corresponding thermal network represented by the netlist, into a single thermal node; the way of carrying out this operation is in itself known, for example applying the superposition principle;
computing 332, with the superposition principle separately from the sources B1 and B2, a reduced thermal matrix $R_{TH}$.

The size of the reduced thermal matrix $R_{TH}$ is equal to the number of sources, for example 2×2 in this case.

Figure 10:
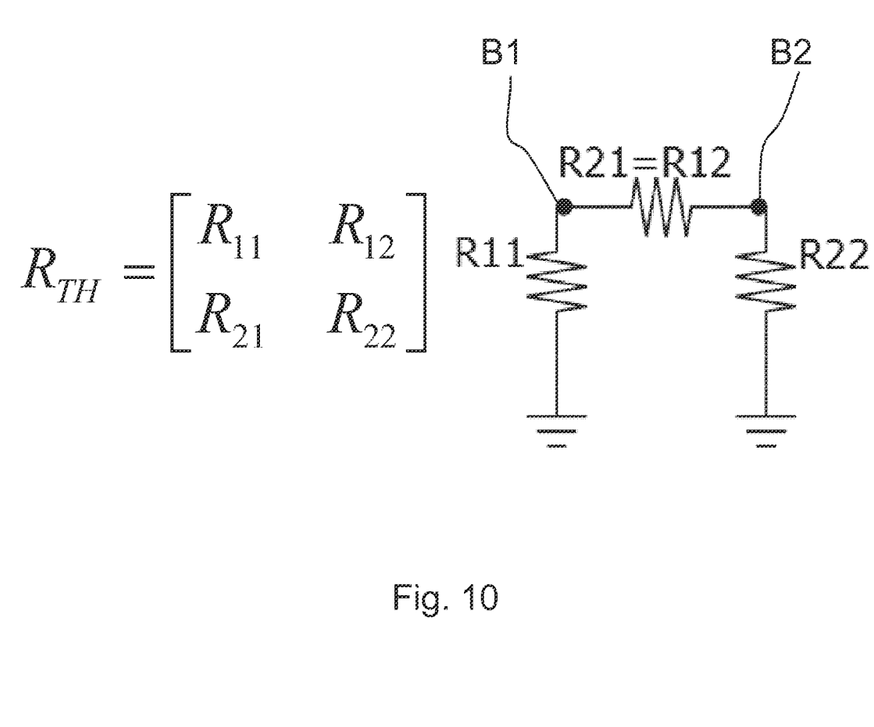

FIG. 10 shows the reduced thermal matrix $R_{TH}$ $$R_{TH} = \begin{bmatrix} R_{11} & R_{12} \\ R_{21} & R_{22} \end{bmatrix}$$

and the corresponding resulting circuit with the nodes B1, B2 corresponding to the sources.

The elements of the reduced matrix are the elements of the two-port-network representation. $R_{11}$ is the equivalent thermal resistance at the node of the source B1, when the node of the source B2 is connected to an open circuit; $R_{22}$, instead, is the equivalent resistance seen from the node of the source B2 with the source B1 replaced by an open circuit, while $R_{12}$ and $R_{21}$ are the mutual thermal resistances (ratio between the open-circuit voltage on the node of the source B1 and the current determined by the source at the node B2, and vice versa). These mutual resistances are in general the same as one another, $R_{12}=R_{21}$.

The matrix $R_{TH}$ can then be passed to step 327 of FIG. 3 for extraction of a reduced netlist NCr.

So far, the method has been described with reference to modeling only via thermal conductances of the thermal network and hence also only to simulation of the static case.

The representation of the thermal network of thermal conductances can be completed, however, via the addition of values of thermal capacity, these values depending upon the volume of the mesh element, in particular the prism with triangular base T and height equal to the thickness of the layer, as well as upon the technological parameters. The corresponding capacitor is connected between the node corresponding to the triangular element and the thermal-ground reference node.

As regards dynamic simulation, by operating as described above adding the thermal capacities, a complex network with a multiplicity of poles is hence obtained. In order to overcome the complexity of the system, it is possible to obtain an approximated system using Galerkin's method, which adds up the response of the system at various frequencies using base vectors (such as Green functions). Examples of this approach for electro-thermal simulations, which is in itself known, may be found for instance in the publications "Compact Modeling of Electrical Devices for Electro-thermal Analysis", L. Codecasa et al., IEEE TRANSACTIONS ON CIRCUITS AND SYSTEMS—I: FUNDAMENTAL THEORY AND APPLICATIONS, VOL. 50, NO. 4, APRIL 2003 and "Compact Models of Dynamic Thermal Networks with Many Heat Sources", L. Codecasa, IEEE TRANSACTIONS ON COMPONENTS AND PACKAGING TECHNOLOGIES, VOL. 30, NO. 4, DECEMBER 2007 (the disclosures of which are hereby incorporated by reference).

It is to be emphasized how, according to an important aspect, it is possible to carry out, on the basis of the complete or reduced netlist, the electro-thermal simulation 600, in an advantageous way in so far as it is possible to carry out a simulation that takes into account both the electrical parameters and the thermal parameters of the substrate.

Further advantages from the computational standpoint in the context of simulation are achieved by the possibility of operating with reduced netlists and, at the end of the procedure of FIG. 4, with reduced complete netlists NCr, i.e., netlists that represent the interaction between two or more devices at the substrate level.

The above reduced netlists are particularly advantageous when, in the context of electro-thermal simulation, it is a question of operating with electrical netlists of components or sub-components in which a thermal node is defined, i.e., a node to which a thermal network is to be connected for the electro-thermal simulation.

There is known, for example, the presence of the above thermal nodes in dedicated compact models, i.e., compact models of standard components, for example the thermal node of the model of the BSIM3SOI MOS. Of course, also a complete thermal netlist can be connected to this node.

According to a further aspect, described in a co-pending application entitled "Method for Automatic Design of an Electronic Circuit, Corresponding System and Computer Program Product" (Italian Application No. TO2013A000574 filed Jul. 9, 2013, now U.S. application Ser. No. 14/324,905, filed Jul. 7, 2014, the disclosures of which are incorporated by reference), it is envisaged to include a thermal node in the description, at the netlist level, of the model or sub-circuit used for simulation of a component (MOS, BJT, HV MOS, resistor, etc.). The definition of thermal node is applied via a dedicated statement in the netlist.

It is thus envisaged to configure the simulation operation carried out by the simulator so as to operate with descriptions of models or sub-circuits of devices, which are in particular non-standard, that are defined as comprising a thermal node. The operation of simulation thus comprises connecting to the thermal node an equivalent current generator that forces into the thermal node a current equivalent to the power dissipated in the above model or sub-circuit, and moreover associating to the voltage that is set up on the thermal node an increase in temperature of the model or sub-circuit with respect to the global temperature.

As has been said, it is envisaged to connect to the thermal node thermal networks that represent the mutual heating of the electronic circuit and can be represented by the complete netlists NC or, in particular, by the reduced netlists NCr, calculated for example between the model or sub-circuit in question and other heat sources of the chip. Furthermore, also a thermal network that models self-heating of the device or sub-circuit can be connected. The thermal effects of these networks are simulated using as source the current forced into the thermal node. The operation of simulation, by associating the voltage on the thermal node to an increase in temperature of the model or sub-circuit, hence updates the parameters of the device models and the sub-circuit parameters (20) according to the local temperature using laws of thermal dependence incorporated in the models or written in the sub-circuit or model parameters.

Hence, the method and system according to the invention enable extraction of a thermal substrate netlist, useful for simulating the thermal behavior at the substrate level between devices in a chip and for electro-thermal simulation. In fact, there is thus included in a single environment the complete electro-thermal simulation, from extraction of the significant structures from the layout to calculation of the matrices (i.e., equations) representing the thermal system via the finite-element method and calculation of corresponding netlists. In particular, the method enables extraction in a simple way of reduced netlists that facilitate calculation. It is moreover advantageously possible to create an equivalent electrical network that models the thermal behavior, in which each source is represented by a node.

The netlists obtained with the method according to the invention can be advantageously connected to the starting circuit or to devices of this circuit via a thermal node present in their circuit description.

Advantageously, as compared, for example, to a method of generation of the orthogonal grid, the procedure using the Delaunay method increases the precision, decreasing the number of elements. In fact, by its characteristic of maximization of the minimum angles of the triangles, this type of triangulation tends to produce equiangle triangles, rendering the grids uniform. The Voronoi transformation yields a dual grid for connection of the thermal conductances.

Of course, without prejudice to the principle of the disclosure, the details of construction and the embodiments may vary, even significantly, with respect to what has been illustrated herein purely by way of non-limiting example, without thereby departing from the sphere of protection. This sphere of protection is defined by the annexed claims.

The method for automatic design of an electronic circuit may of course be comprised in the process of production of the corresponding electronic circuit, which integrates the operations of design with operations of machining of the integrated circuit, for example in the field of the so-called "silicon foundry", i.e., the plant or the part of production line that carries out the above machining operations.

The method for automatic design of an electronic circuit according to the invention may be used not only to obtain a thermal netlist at the device level, but also to obtain in a similar way netlists at the floorplan and macrocell level.

The output netlists are preferably written with pure SPICE syntactic format and are compatible with simulators of a SPICE type (Hsim and Ultrasim) such as Eldo and Spectre.

The method for automatic design of an electronic circuit according to the invention can be extended, thanks to the multilayer approach, also to technologies different from BCDx, and may in any case be applied to technologies such as BCD8AS, BCD8SP, BCD8SAutoDTI, BCD8SOI, BCD8SP DTI, BCD9s, and BCD9sL.

What is claimed is:

1. A non-transitory computer storage medium having stored thereon computer program code that, when executed by a processor, performs the steps of:

generating a layout of an electronic circuit;

generating abstract data at a level of a substrate that are associated to the layout of said electronic circuit;

generating a grid of partitioning, with respect to a view regarding said abstract data, into meshes and nodes and applying it to said substrate; and extracting, on the basis of said partition grid, a list of nodes or netlist representing a thermal network that represents the thermal behavior of the substrate or of portions or elements of the substrate, wherein said netlist is configured for use in simulation operations, in particular of a SPICE type, for making an evaluation of said thermal effects in said electronic circuit; and supplying said netlist to one of an operation of simulation of the thermal behavior and an operation of coupled electro-thermal simulation which simulates simultaneously both the electrical behavior and the thermal behavior of the electronic circuit or of a device thereof, taking into account the interactions with the electronic circuit or with parts thereof.

2. The non-transitory computer storage medium according to claim 1, wherein the computer program code further performs the steps of:

making an electro-thermal simulation via configuration of said simulation operation for operating with descriptions of models or sub-circuits of said electronic circuit defined as comprising a thermal node, connecting to said thermal node an equivalent current generator that forces into said thermal node a current equivalent to the power dissipated in said model or sub-circuit, and associating to a voltage that is set up on said thermal node an increase in temperature of the model or sub-circuit with respect to a global temperature by connecting to said thermal node a thermal network that represents a mutual heating of the electronic circuit and is represented by said netlist calculated to have as sources said model or sub-circuit and another heat source of the electronic circuit.

3. The non-transitory computer storage medium according to claim 2, wherein the computer program code further performs the step of associating thermal capacities to the nodes which are calculated as a function of a volume of a corresponding element and of respective technological parameters which are associated between the node and a thermal-ground reference node.

4. The non-transitory computer storage medium according to claim 1, wherein the computer program code further performs the steps of:

discriminating, in said layout, regions on the basis of a dissipation-based criterion;

dividing the electronic circuit according to a plurality of vertical layers;

separating each of said vertical layers into different areas on the basis of given technological parameters that identify said different areas; and applying said grid to each area of each layer.

5. The non-transitory computer storage medium according to claim 4, wherein applying said grid comprises applying a Delaunay triangular grid and obtaining from said Delaunay triangular grid corresponding Voronoi points.

6. The non-transitory computer storage medium according to claim 4, wherein the computer program code further performs the steps of:

for each layer, analyzing grid elements obtained from generating the grid;

calculating thermal parameters to be associated to said grid element as a function of a technology-configuration file regarding the grid element analyzed; and constructing a representation of the layer as a sparse matrix of said thermal parameters on the basis of said calculated thermal parameters.

7. The non-transitory computer storage medium according to claim 6, wherein the computer program code further performs the steps of:

inserting sparse matrices of the layer into a general sparse matrix; and converting said general sparse matrix into a complete netlist.

8. The non-transitory computer storage medium according to claim 6, wherein the computer program code further performs the steps of:

extracting thermal dependences between two or more heat sources identified in said sparse matrix via the operations of:

reducing each source to a single node;

computing a reduced thermal matrix with the superposition principle separately from each source; and extracting a corresponding reduced netlist.

9. A non-transitory computer storage medium having stored thereon computer program code that, when executed by a processor, performs the steps of:

generating a layout of an electronic circuit;

generating abstract data at a level of a substrate that are associated to the layout of said electronic circuit;

generating a grid of partitioning, with respect to a view regarding said abstract data, into meshes and nodes and applying it to said substrate; and extracting, on the basis of said partition grid, a list of nodes or netlist representing a thermal network that represents the thermal behavior of the substrate or of portions or elements of the substrate in terms of both thermal conductances and thermal capacities, wherein said netlist is configured for use in simulation operations, in particular of a SPICE type, for making an evaluation of said thermal effects in said electronic circuit.

10. The non-transitory computer storage medium according to claim 9, wherein the computer program code further performs the step of supplying said netlist to one of an operation of simulation of the thermal behavior and an operation of coupled electro-thermal simulation which simulates simultaneously both the electrical behavior and the thermal behavior of the electronic circuit or of a device thereof, taking into account the interactions with the electronic circuit or with parts thereof.

11. The non-transitory computer storage medium according to claim 10, wherein the computer program code further performs the steps of:

making an electro-thermal simulation via configuration of said simulation operation for operating with descriptions of models or sub-circuits of said electronic circuit defined as comprising a thermal node, connecting to said thermal node an equivalent current generator that forces into said thermal node a current equivalent to the power dissipated in said model or sub-circuit, and associating to a voltage that is set up on said thermal node an increase in temperature of the model or sub-circuit with respect to a global temperature by connecting to said thermal node a thermal network that represents a mutual heating of the electronic circuit and is represented by said netlist calculated to have as sources said model or sub-circuit and another heat source of the electronic circuit.

12. The non-transitory computer storage medium according to claim 11, wherein the computer program code further performs the step of associating thermal capacities to the nodes which are calculated as a function of a volume of a corresponding element and of respective technological parameters which are associated between the node and a thermal-ground reference node.

13. The non-transitory computer storage medium according to claim 9, wherein the computer program code further performs the steps of:
discriminating, in said layout, regions on the basis of a dissipation-based criterion;
dividing the electronic circuit according to a plurality of vertical layers;
separating each of said layers into different areas on the basis of given technological parameters that identify said different areas; and
applying said grid to each area of each layer.

14. The non-transitory computer storage medium according to claim 13, wherein applying said grid comprises applying a Delaunay triangular grid and obtaining from said Delaunay triangular grid corresponding Voronoi points.

15. The non-transitory computer storage medium according to claim 13, wherein the computer program code further performs the steps of:
for each layer, analyzing grid elements obtained from generating the grid;
calculating thermal parameters to be associated to said grid element as a function of a technology-configuration file regarding the grid element analyzed; and
constructing a representation of the layer as a sparse matrix of said thermal parameters on the basis of said thermal parameters.

16. The non-transitory computer storage medium according to claim 15, wherein the computer program code further performs the steps of:
inserting sparse matrices of the layer into a general sparse matrix; and
converting said general sparse matrix into a complete netlist.

17. The non-transitory computer storage medium according to claim 15, wherein the computer program code further performs the steps of:
extracting thermal dependences between two or more heat sources identified in said sparse matrix via the operations of:
reducing each source to a single node;
computing a reduced thermal matrix with the superposition principle separately from each source; and
extracting a corresponding reduced netlist.

18. A non-transitory computer storage medium having stored thereon computer program code that, when executed by a processor, performs the steps of:
generating a layout of an electronic circuit;
generating abstract data at a level of a substrate that are associated to the layout of said electronic circuit;
generating a grid of partitioning, with respect to a view regarding said abstract data, into meshes and nodes and applying it to said substrate, said grid including grid elements;
calculating thermal parameters for each grid element;
constructing a sparse matrix of said thermal parameters;
extracting thermal dependences between two or more heat sources identified in said sparse matrix via the operations of:
reducing each source to a single node;
computing, with the superposition principle separately from each heat source, a thermal matrix; and
extracting a corresponding thermal netlist representing a thermal network that represents the thermal behavior of the substrate or of its portions or elements of said substrate,
wherein said thermal netlist is configured for use in simulation operations, in particular of a SPICE type, for making an evaluation of said thermal effects in said electronic circuit.

19. The non-transitory computer storage medium according to claim 18, wherein the computer program code further performs the steps of supplying said thermal netlist to one of an operation of simulation of the thermal behavior and an operation of coupled electro-thermal simulation which simulates simultaneously both the electrical behavior and the thermal behavior of the electronic circuit or of a device thereof, taking into account the interactions with the electronic circuit or with parts thereof.

20. The non-transitory computer storage medium according to claim 19, wherein the computer program code further performs the steps of:
making an electro-thermal simulation via configuration of said simulation operation for operating with descriptions of models or sub-circuits of said electronic circuit defined as comprising a thermal node,
connecting to said thermal node an equivalent current generator that forces into said thermal node a current equivalent to the power dissipated in said model or sub-circuit, and
associating to a voltage that is set up on said thermal node an increase in temperature of the model or sub-circuit with respect to a global temperature by connecting to said thermal node a thermal network that represents a mutual heating of the electronic circuit and is represented by said thermal netlist calculated to have as sources said model or sub-circuit and another heat source of the electronic circuit.

21. The non-transitory computer storage medium according to claim 20, wherein the computer program code further performs the step of associating thermal capacities to the nodes defined by said sparse matrix which are calculated as a function of a volume of a corresponding element and of respective technological parameters which are associated between the node and a thermal-ground reference node.

22. The non-transitory computer storage medium according to claim 18, wherein the computer program code further performs the steps of:
discriminating, in said layout, regions on the basis of a dissipation-based criterion;
dividing the electronic circuit according to a plurality of vertical layers;

separating in each of said layers different areas on the basis of given technological parameters that identify said different areas; and applying said grid to each area of each layer.

23. The non-transitory computer storage medium according to claim 22, wherein applying said grid comprises applying a Delaunay triangular grid and obtaining from said Delaunay triangular grid corresponding Voronoi points.

24. The non-transitory computer storage medium according to claim 22, wherein the computer program code further performs the steps of:

for each layer, analyzing grid elements obtained from generating the grid;

calculating thermal parameters to be associated to said grid element as a function of a technology-configuration file regarding the grid element analyzed; and constructing the sparse matrix on the basis of said thermal parameters of the grid elements.

25. The non-transitory computer storage medium according to claim 24, wherein the computer program code further performs the steps of:

inserting sparse matrices of the layer into a general sparse matrix; and converting said general sparse matrix into said thermal netlist.

* * * * *